W. A. KEYS.
NECKWEAR.
APPLICATION FILED APR. 27, 1916.
Reissued May 30, 1916.
14,142.
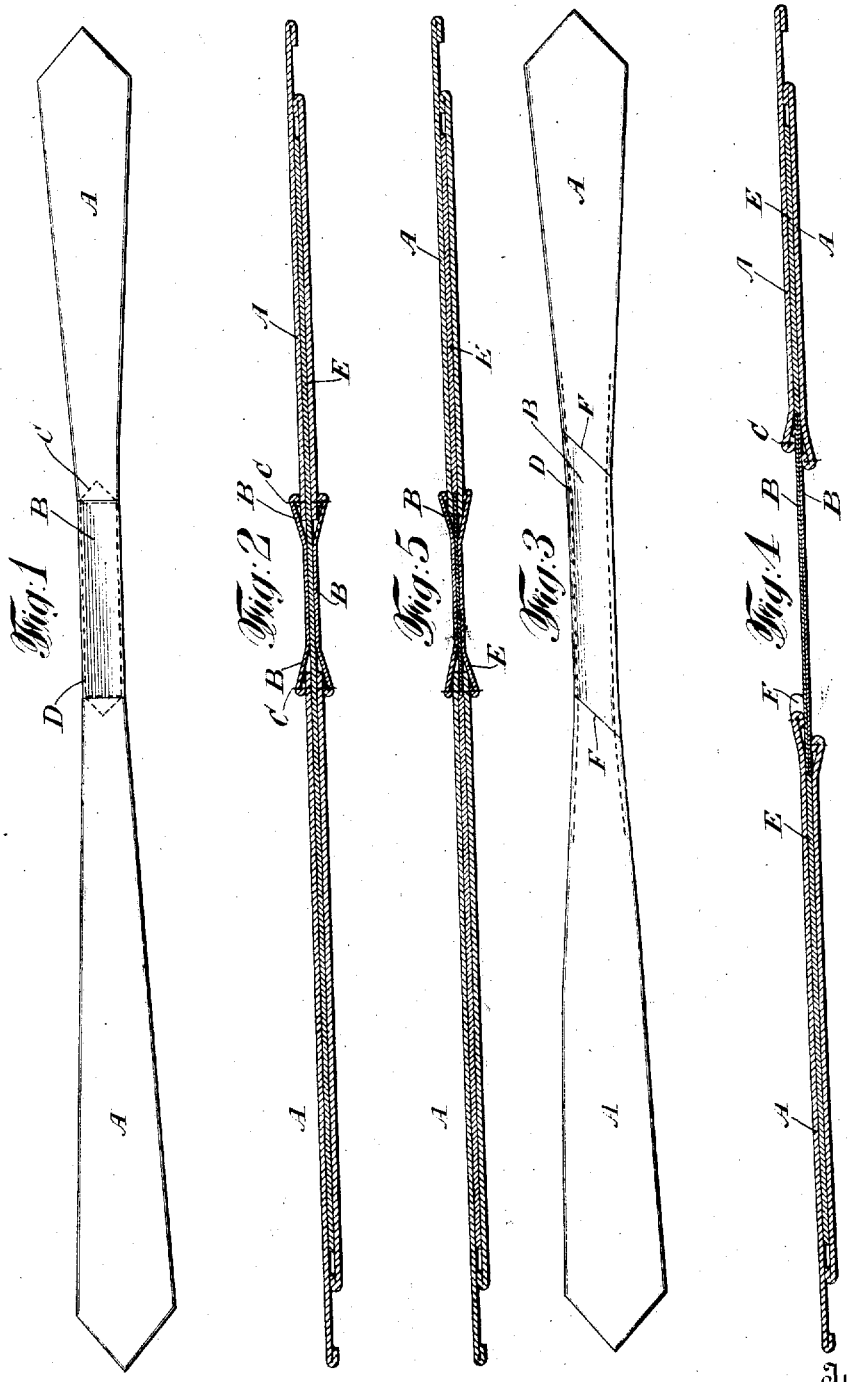
Inventor
William A. Keys
By his Attorneys
Kenyon & Kenyon

UNITED STATES PATENT OFFICE.

WILLIAM A. KEYS, OF NEW YORK, N. Y., ASSIGNOR TO SLIP SCARF COMPANY, A CORPORATION OF NEW YORK.

NECKWEAR.

14,142. Specification of Reissued Letters Patent. Reissued May 30, 1916.

Original No. 1,098,908, dated June 2, 1914, Serial No. 449,606. Application for reissue filed April 27, 1916. Serial No. 94,078.

*To all whom it may concern:*

Be it known that I, WILLIAM A. KEYS, a citizen of the United States, and a resident of the city, county, and State of New York, have invented certain new and useful Improvements in Neckwear, of which the following is a specification.

My invention relates to neck-ties, and is adapted for any form of neckwear, either four-in-hand ties, ascots, or what are commonly known as string ties, but it is especially adapted for neckwear to be worn with what are known as two-fold collars, which are in vogue at the present time.

As is well known, after an ordinary tie is placed around the neck-band of a two-fold collar between the folds, and the collar then adjusted on the neck of the wearer, it is only with extreme difficulty that the tie can be moved back or forth, the result being that it is almost impossible to properly adjust the tie on the neck of the wearer after the knot has been tied, and it is the overcoming of this difficulty to which my invention is addressed.

I have found that by inserting in the neck-band of the tie, in place of the material of the tie itself, a piece of silk, or satin, or some other smooth and thin material, it is possible to make a neck-tie which will move back and forth on two-fold collars very readily, and which will permit the adjustment of the knot after the tie has been tied, without any difficulty.

In the drawing forming part hereof, I have shown my invention as applied to a four-in-hand tie.

Figure 1 represents a plan view of a neck-tie showing my invention, and Fig. 2 a sectional view thereof. Figs. 3 and 4 are, respectively, a plan view, and a sectional view of a necktie in which independent interlinings for the tying ends are shown. Fig. 5 is a modification of the tie shown in Figs. 1 and 2.

In the drawing A A are the tying ends of the neck-tie.

B is a strip of suitable material like silk or satin, or other relatively anti-friction material, inserted in the neck-band at a point adjacent to the rear of the collar.

E, Fig. 2, is the interlining which extends throughout the tying ends and the neckband of the tie.

In Figs. 1 and 2 the inserted strip of relatively anti-friction material is secured to the tying ends of the tie by rows of stitching C. It will be noted in the cross-section in Fig. 2 that the tying ends of the tie are relatively thicker than the central part of the neck-band or part adjacent to the rear of the collar. If desired, this central part or bridge piece can be made thinner, as shown in Fig. 5, by having the interlining E substantially thinner at the rear of the collar than it is in the tying ends. If desired, it may be made even thinner by omitting entirely the interlining at the rear of the collar, as shown in Figs. 3 and 4, where, as can be readily seen, the neck-band at the rear of the collar is only about one-third the thickness of the tying-ends of the tie. In Figs. 3 and 4 I have shown the strip of relatively anti-friction material inserted on a bias as at F, this being advisable where the neck-tie is cut on a bias.

In the drawing D is a row of stitching which, as shown in Fig. 3, extends lengthwise of the inserted portion B of the neck-band and parallel to the edge of the same, and into the portions of the neck-band adjacent to the two ends of the inserted portion B. I have found that rows of stitching running lengthwise of the inserted portion B and extending into the two adjacent ends of the neck-band, strengthen the tie and have a tendency to prevent the same from stretching, particularly where neck-ties are cut on the bias, these rows of stitching I prefer to have meet, as shown in Fig. 1, forming a point at each end of an intermediate portion of the tie, and in this way it penetrates the interlining whether the tie has independent interlinings in the tying ends, or has an interlining thinner in the neck-band than in the tying ends, and the interlinings are thereby held in position.

Such modifications and changes as would readily suggest themselves to any one skilled in the art, may be made without departing from the spirit of my invention.

What I claim as new and desire to secure by Letters Patent, is:

1. In a necktie, the combination of a neckband and two tying ends, a portion of said neckband being made of a separate piece of relatively antifriction material and rows of stitching extending lengthwise of the said portion and into the two adjacent parts of the neckband.

2. In a necktie, the combination of a neckband and two tying ends, formed of the covering fabric and interlining, an intermediate portion of the tie being made of a separate piece of material, and stitches extending lengthwise along the edges of said intermediate portion and across the tie in a direction oblique to the edges thereof thereby engaging with the interlining to hold the same in position.

3. In a necktie formed of a neckband and two tying ends composed of a two-ply cover fabric and an interlining, an intermediate portion of said cover fabric being made of a separate piece of relatively anti-friction material, rows of stitches passing through the plies of the neckband and said separate piece of material and extending substantially along the edges of said intermediate portion, the said rows of stitches at the end of said intermediate portion passing in a direction oblique to the edges of said intermediate portion and meeting in a point intermediate the edges of the neckband, the said stitching engaging with and holding the interlining in position.

4. In a necktie having a neckband and two tying ends, an interlining thinner in the neckband than in the tying ends, a two-ply cover fabric, rows of stitching extending lengthwise of the necktie near the edges of an intermediate portion thereof, said rows of stitching passing at the end of said intermediate portion in a direction oblique to the edges of said intermediate portion and engaging with the said interlining to hold same in position.

5. In a necktie having a neckband and tying ends, an interlining, a cover fabric, rows of stitching extending lengthwise of the necktie near each of the edges of an intermediate portion of said necktie, said rows of stitching passing at their ends in a direction oblique to the edges of said intermediate portion and meeting intermediate the edges of said tie, said rows of stitching engaging with said interlining to hold same in position.

6. In a necktie having a neckband and tying ends, an interlining, a cover fabric, rows of stitching extending lengthwise of the necktie near each of the edges of an intermediate portion of said necktie, rows of stitching passing in a direction oblique to the edges of said intermediate portion and meeting intermediate the edges of said tie, said rows of stitching engaging with said interlining to hold same in position.

7. In a necktie having a neckband and tying ends, a folded fabric forming a tying end, a separate piece of folded fabric forming a neckband, said tying end and said neckband being attached to each other by stitching at their adjacent ends, the edges of said neckband and said tying end at their place of attachment being substantially flush or in alinement.

8. In a necktie having a neckband and tying ends, a folded fabric forming a tying end, a separate piece of relatively smoother folded fabric forming a neckband, said tying end and said neckband being attached to each other by stitching at their adjacent ends, the edges of said neckband and said tying end at their place of attachment being substantially flush or in alinement.

In testimony whereof, I have signed my name to this specification.

WILLIAM A. KEYS.